United States Patent
Li et al.

(10) Patent No.: US 8,391,777 B2
(45) Date of Patent: Mar. 5, 2013

(54) METHODS AND EQUIPMENT FOR PERFORMING CHANNEL AWARE RELAYS IN AN ENHANCED RELAY CLUSTER

(75) Inventors: Hui Li, Beijing (CN); Tao Liu, Beijing (CN); Xinglin Wang, Beijing (CN); Yi Sheng Xue, Beijing (CN); Wolfgang Zirwas, München (DE)

(73) Assignee: Nokia Siemens Network GmbH & Co. KG, Munich (DE)

( * ) Notice: Subject to any disclaimer, the term of this patent is extended or adjusted under 35 U.S.C. 154(b) by 528 days.

(21) Appl. No.: 12/311,436

(22) PCT Filed: Sep. 26, 2007

(86) PCT No.: PCT/EP2007/060202
§ 371 (c)(1),
(2), (4) Date: Sep. 21, 2009

(87) PCT Pub. No.: WO2008/037733
PCT Pub. Date: Apr. 3, 2008

(65) Prior Publication Data
US 2010/0015914 A1    Jan. 21, 2010

(30) Foreign Application Priority Data

Sep. 30, 2006   (CN) .......................... 2006 1 0141588

(51) Int. Cl.
*H04B 3/36* (2006.01)
*H04B 7/185* (2006.01)
*H04B 7/15* (2006.01)

(52) U.S. Cl. .......................... 455/7; 455/13.1; 455/11.1

(58) Field of Classification Search ............. 455/7, 13.1, 455/517, 9, 15, 18, 11.1, 22, 522, 518, 12.1, 455/452.2, 67.3, 527, 507; 370/311, 320, 370/315, 329, 328, 316, 208, 238, 350, 468
See application file for complete search history.

(56) References Cited

U.S. PATENT DOCUMENTS
(Continued)

FOREIGN PATENT DOCUMENTS

| DE | 199 50 005 A1 | 4/2001 |
| EP | 1 613 003 A1 | 1/2006 |
| WO | 2006/023771 A2 | 3/2006 |
| WO | 2007/050191 A1 | 5/2007 |

OTHER PUBLICATIONS

International Search Report for Application No. PCT/EP2007/060202; mailed Feb. 18, 2008.

(Continued)

*Primary Examiner* — Nay A Maung
*Assistant Examiner* — Cindy Trandai
(74) *Attorney, Agent, or Firm* — Staas & Halsey LLP (57) ABSTRACT

This invention provides a type of method used for providing channel aware relays in enhanced relay clusters. This method is based on the Centralized Cluster Relay Implementation Proposal, and is implemented by transferring MMR-BS channel information based functions to RS. Specifically, in this invention, RS receives authorization from the MMR-BS to receive the channel information from the MS or next single-hop RS point within its single-hop range, and, after performing applicable channel aware relays, reports the processing result to MMR-BS; MMR-BS configures the signal according to the processing result and joins RS to transmit the control signal to the cluster MS. Using the method provided by this invention can reduce the channel overhead between MMR-BS and RS, and at the same time ensure that the RS composition is simple, and the production costs are low.

33 Claims, 4 Drawing Sheets

U.S. PATENT DOCUMENTS

| | | | |
|---|---|---|---|
| 2005/0232183 A1 | 10/2005 | Sartori et al. | |
| 2006/0046643 A1 | 3/2006 | Izumikawa et al. | |
| 2007/0210894 A1* | 9/2007 | Park et al. | 340/5.2 |
| 2008/0031174 A1* | 2/2008 | Saifullah et al. | 370/311 |
| 2008/0045148 A1* | 2/2008 | Okuda | 455/18 |
| 2008/0310542 A1* | 12/2008 | Gao et al. | 375/267 |
| 2009/0307484 A1* | 12/2009 | Zhang et al. | 713/153 |
| 2011/0182231 A1* | 7/2011 | Wang et al. | 370/315 |

OTHER PUBLICATIONS

English Abstract of Russian Patent Application No. 2005136867, published May 27, 2007.

IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1 (IEEE Std 802.16e™-2005 and IEEE Std 802.16™-2004/Cor1-2005); IEEE Computer Society and the IEEE Microwave Theory and Techniques Society; Feb. 2006; pp. i-822.

IEEE Standard for Local and metropolitan area networks, Part 16: Air Interface for Fixed Broadband Wireless Access Systems (IEEE Std 802.16™-2004, Revision of IEEE Std 802.16-2001) IEEE Computer Society and the IEEE Microwave Theory and Techniques Society; Oct. 2004; pp. i-857.

* cited by examiner

METHODS AND EQUIPMENT FOR PERFORMING CHANNEL AWARE RELAYS IN AN ENHANCED RELAY CLUSTER

CROSS REFERENCE TO RELATED APPLICATIONS

This application U.S. National Stage of International Application No. PCT/EP2007/060202, filed Sep. 26, 2007 and claims the benefit thereof. The International Application claims the benefits of Chinese Application No. 200610141588.8 filed on Sep. 30, 2006, both applications are incorporated by reference herein in their entirety.

BACKGROUND

Described below is a type of integrated multi-hop wireless communication system, specifically the methods and equipment involved in performing channel aware relays in an enhanced relay cluster of a wireless communication system.

In traditional wireless honeycomb communication networks, the base station always transmits information or data directly to the transfer terminal in the cluster (MS); this type of method, which does not require relay transmission, is frequently called "single-hop" transmission. When the distance between the base station and MS is relatively long or contains obstacles, "single-hop" transmission can often attain only extremely limited communication quality, to the extent that it is necessary to reduce transmission speed in order to maintain the requisite communication quality.

Figure 1:
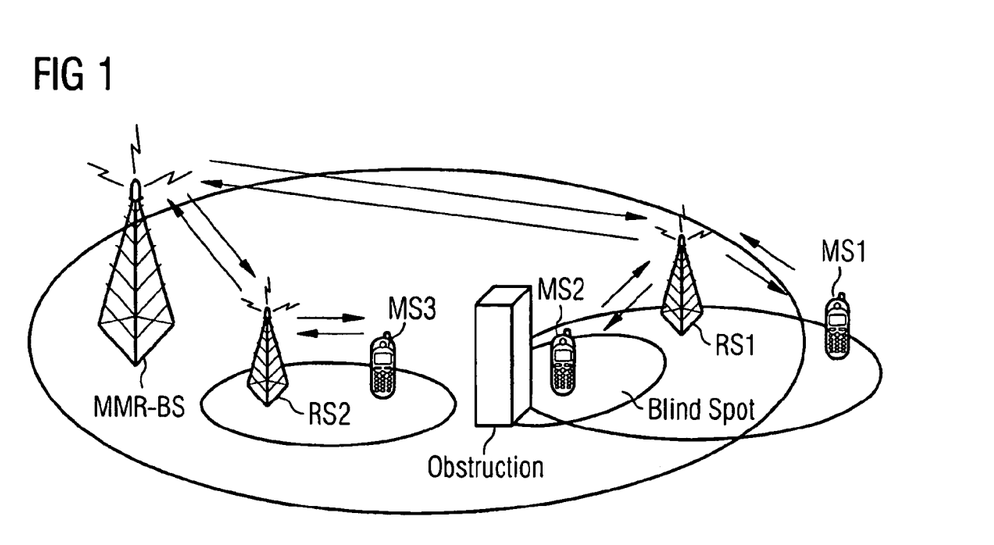
FIG. 1 is the schematic for the enhanced relay cluster in a wireless honeycomb communication network.

For this reason, in recent years the use of "multi-hop" relay transmission methods has been suggested for use in honeycomb communication networks, thus bringing about the idea of an enhanced relay cluster. FIG. 1 depicts a type of enhanced relay cluster in a honeycomb network. As can be seen from FIG. 1, MS1 is located outside the "single-hop" range achievable by multi-hop relay supported base stations, and MS2 is located within an area affected by obstacles. These two terminals are thus unable to communicate with the base station using traditional "single-hop" methods. In the enhanced relay cluster shown in FIG. 1, however, MS1 and MS2 can communicate with the base station using a two-hop process via the relay station's (RS) RS1 relay within the cluster, and in this way expand the coverage area. Furthermore, MS3 in the cluster can also assist in communications between the RS2 relay and the base station. As the single-hop distance between any two nodes (RS2 and MS3, RS2 and base station) is very close, all nodes can transmit data at a higher speed, and can thus satisfy the demands of real-time video transmission operations for high throughput.

It can be seen from FIG. 1 that multi-hop techniques integrated with honeycomb clusters not only expand the cluster base station's coverage area and eliminate the shadow effect caused by wireless communication blind spots, but also to a certain extent increases the throughput of the entire system as a whole. The advantages of an enhanced relay cluster have spurred researchers on to the next step, to research how best to integrate multi-hop technology with wireless honeycomb communication systems. For this reason, IEEE 802.16 formed the Relay Task Group, whose purpose is to implement relays into the IEEE 802.16 system, and to provide specific proposals to be written into the IEEE 802.16j protocol. IEEE 802.16j is backwards-compatible with IEEE 802.16e, and at the same time requires relay transparency toward MS, so that once the relay is introduced, no modification whatsoever of MS is required.

The type of simple direct enhanced relay cluster implementation method introduced by the Relay Task Group manages the entire enhanced relay cluster through the base station, and is called the Centralized Implementation Proposal. In this proposal, any MS and RS in the enhanced relay cluster is controlled and managed through the multi-hop transfer relay supported base station (MMR-BS); RS itself only has a few simple media access control (MAC) capabilities, and transfers operation data in accordance with MMR-BS. Therefore, the RS production costs in this proposal are low, and the design is simple and convenient to implement. Another type of implementation proposal for enhanced relay clusters is called the Distributed Implementation Proposal. In this proposal, the RS distributed through the cluster can possess higher MAC capabilities so that, for example, RS can make use of user-defined control signal frame, and perform resource distribution and control management independently. The Distributed Implementation Proposal thus provides the entire network with more robustness and increased flexibility.

The aforementioned implementation proposals both have advantages, but each has its respective defects with respect to the channel aware relays commonly used in wireless communication systems. Channel aware relays generally refer to the use of channel status to make strategic decisions in accordance with the MS report, thereby enabling the dynamic changing of transmission strategy technology, including for example, channel aware resource allocation, self-adapting code modulation, channel aware combined automatic retransmission (H-ARQ) technology, etc. The following provides an explanation of the respective features of the Centralized Implementation Proposal and the Distributed Implementation Proposal in the implementation of channel aware relay projects in accordance with channel aware resource allocation.

Figure 2:
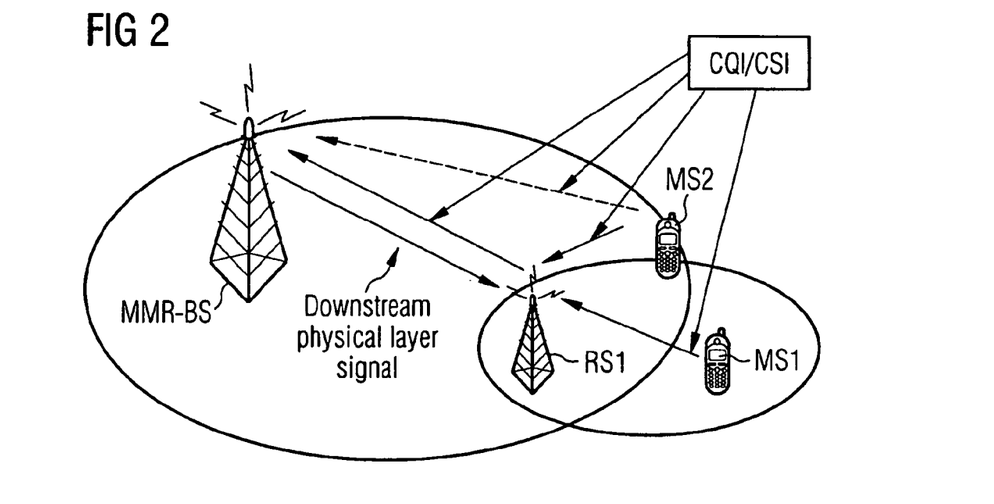
FIG. 2 is the schematic for channel aware resource allocation implemented in the Centralized Implementation Proposal.

FIG. 2 depicts the channel aware resource allocation situation created in the Centralized Implementation Proposal. FIG. 2 shows that as before, the cluster's MMR-BS controls the management rights for the transmission of the entire cluster's resources. Every MS (or multi-hop terminal) through the multi-hop communication link must periodically, through RS (see the hardwire uplink in FIG. 2), or directly (indicated by the dashed line) report channel information to the MMR-BS, such as channel quality information (CQI) and/or channel state information (CSI). The MMR-BS then allocates wireless resources for each MS in accordance with the gathered CQI and/or CSI, and assists RS (such as RS1) to indicate to all MS the allocated wireless resources through a downstream control signal. In such circumstances, although the RS capabilities are simple, and the production costs low, the RS must periodically send large amounts of channel information to MMR-BS, which therefore results in excessive channel use between RS and MMR-BS, which ties up respective wireless resources.

In contrast to the Centralized Implementation Method, the Distributed Implementation Method allows every distributing RS to allocate relatively stronger MAC capabilities, i.e., RS can independently carry out resource distribution for the MS within its single-hop scope. Now MS only needs to report channel information directly to RS, confirm wireless resource allocation through RS, and distribute the confirmed resources to every MS using the user-defined control information frame composition of the RS. This Distributed Implementation Method can quickly conveniently perform channel aware resource allocation with extremely low channel expenditure. However, the stronger RS autonomous MAC capabilities in this proposal mean that RS design is therefore complex, production cost relatively high, and at the same time the cooperation between each RS as well as between RS and MMR-BS, such as in transferability management, cluster management and division of resources between each RS, will also be relatively complex, and will therefore consume relative more overhead information. Because of this, the Distributed Implementation Proposal is not ideal for networks that have cost restriction requirements, or where there are limited RS node enhanced relay clusters.

From this, in terms of executing channel aware relays, both the Centralized Implementation Proposal and the Distributed Implementation Proposal cannot both cut costs and reduce channel overhead. For this reason, it is now necessary to introduce a compromise proposal to carry out the channel aware relays in enhanced relay clusters.

SUMMARY

The purpose is to provide a type of method and system to carry out channel aware relays in enhanced relay clusters so as to reduce channel overhead between the RS and multi-hop relay supported base station, while at the same time maintaining reasonable control of design costs and level of complexity.

In order to realize the aforementioned purposes, relay stations are provided within an enhanced relay cluster, which includes: authorization information for channel aware relays provided by the authorized relay station is received from the base station; in accordance with this authorization information, processing results are received via channel aware relays based on the channel information received from at least one terminal or the next single-hop relay station within a single-hop range.

Also provided is a multi-hop relay supported base station in an enhanced relay cluster, which includes: the transmission of authorization information for executing channel aware relays to at least one relay station; the processing information is received through channel awareness from at least one relay station; the signal is generated in accordance with the aforementioned processing result.

Furthermore, a multi-hop relay supported base station and relay station may be used in implementing the aforementioned methods.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The channel aware relays are provided in enhanced relay clusters in accordance with the Centralized Implementation Proposal, and is executed and implemented by giving authorization to RS through MMR-BS part management rights. Specifically speaking, the RS only has simple MAC functions and receives MMR-BS authorization; the MS or next single-hop RS receives the channel information from this RS, and after providing the corresponding channel aware relays, reports the processing result to the MMR-BS; the MMR-BS finally combines with RS to send the processing result control signal to all MS in the cluster, so as to provide control management of all MS in the cluster.

It should be explained here that although the method is described on the basis of IEEE 802.16e, the concept is absolutely not limited to this standard definition. All methods can be applied to enhanced relay clusters with fixed relay stations, as well as other appropriate applicable environments. At this point the terms "MMR-BS" and "RS" are only one type of definite explanation, and cannot be viewed as limitations on all substantive capabilities.

Figure 3:
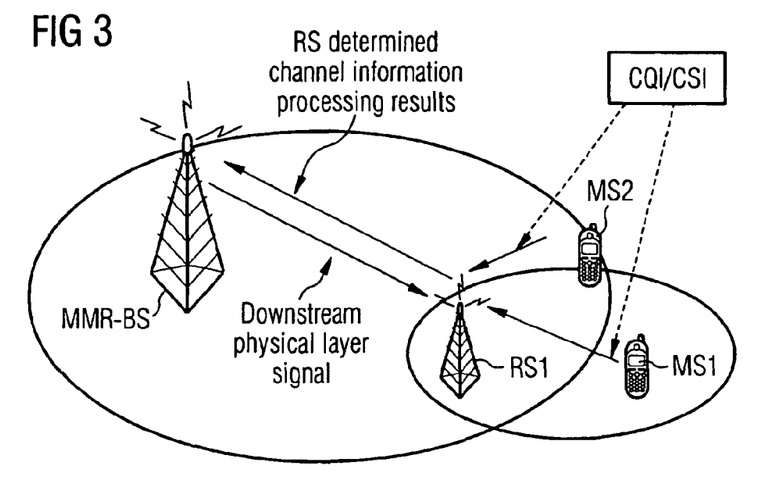
FIG. 3 is the schematic for channel aware resource allocation implemented in an enhanced relay cluster in accordance with one of the implementation examples.
Figure 4:
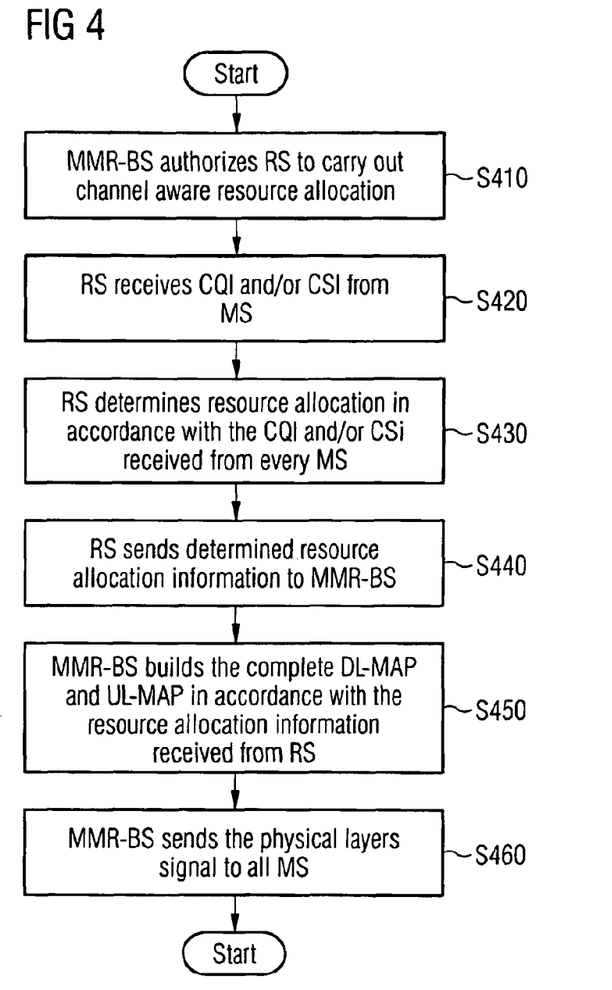
FIG. 4 is the flow chart for channel aware resource allocation in an enhanced relay cluster in accordance with one of the implementation examples.

FIGS. 3 and 4 respectively depict the schematic and flow chart for an implementation example of the aforementioned concept. This implementation example explains the method for implementing channel aware resource allocation in an enhanced relay cluster.

In FIG. 3, MMR-BS is with the authorized RS1 to execute resource allocation processing in accordance with the multi-hop relay supported base station improved by the idea. RS1 is a relay station based on the Centralized Implementation Proposal to increase channel aware resource allocation, and its resource dispatch functions may be switched on or off based on the authorization information or authorization cancel information from MMR-BS. MS1 and MS2 can initiate multi-hop terminal communication through the RS1 relay, and their composition is the same as the mobile terminals in the IEEE 802.16e honeycomb network.

As FIG. 3 shows, MS1 and MS2 respectively send the channel information CQI/CSI to the authorized RS1; after initiating resource allocation, RS1 reports the processing result to MMR-BS, and the control signal is finally sent to all MS through the MMR-BS control signal, either directly or with the aid of RS. FIG. 4 specifically shows the flow chart for the aforementioned channel aware resource allocation carried out by the enhanced relay cluster shown in FIG. 3. The combined methods explained below in detail are given in FIG. 4.

Authorization Process

As FIG. 4 shows, MMR-BS first sends the authorization information to RS1 through the downstream control signal, and the authorized RS1 provides channel aware resource allocation (S410). This authorization information includes the preset wireless resource range that can be independently dispatched and allocated through RS1.

Figure 5:
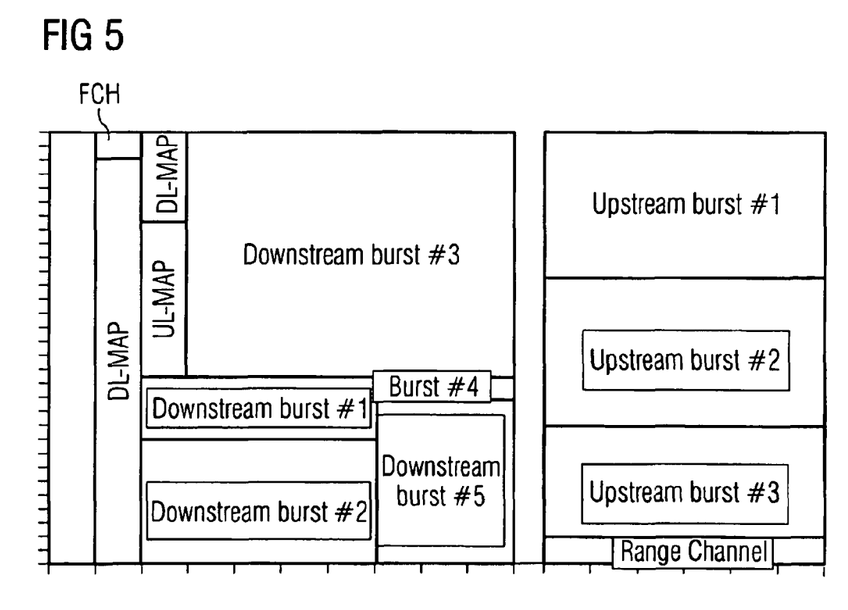
FIG. 5 is the physical layer form stipulated in the 802.16e standard.

For the convenient transmission of the authorization information, in this implementation example the preset wireless resource range expressed as MMR-BS allocates the time frequency resource used in MS communication to the RS. FIG. 5 shows the physical layer frame composition in the IEEE 802.16e standard. Among others, the frame control header (FCH) field is used to indicate the length of the DL-MAP as well as the code modulation mode, and UL-MAP and DL-MAP are respectively used to indicate the time frequency resource area and applicable code modulation form of the upstream and downstream burst. MMR-BS is used with RS1 and its MS (including MS1 and MS2), as shown in FIG. 5, to report the size and position of the time frequency resource area burst transmission, known as preset wireless resource range, to RS1, so that RS1 can logically allocate the aforementioned time frequency resource area to different MS according to the channel state of every MS.

Furthermore, this authorization information can include (but will not necessarily include) the combination of MS authorized by RS1 to carry out resource allocation. In other words, RS1 can be either partly or completely authorized to perform resource allocation to its multiple MS within a single-hop range. For example, in FIG. 3, MS2 is located within a single-hop range of MMR-BS, and as MS2 can independently carry out resource allocation through MMR-BS, and can also carry out resource allocation through RS1, this is specifically dependent upon the indication of the authorization information. This implementation example supposes that MMR-BS authorizes RS1 to handle the resource allocation of MS1 and MS2.

It should be indicated here that when a multi-hop transmission of two or more hops occurs within the cluster, the RS1 equipment in a single-hop range may possibly not only include multi-hop terminals, but may also include the next single-hop relay station. In such a situation, the next single-hop relay station can be viewed as a multi-hop terminal (e.g., MS2), whose status, use, and execution capabilities can be considered the same as the multi-hop terminal, the difference being that the next single-hop relay station can still transfer signals or data to other MS.

Channel Aware Relay Procedures

Once RS1 receives the authorization information from the MMR-BS, it receives the channel information, which includes CQI and/or CSI (S420), from MS1 and MS2 (or the next single-hop relay station). RS1 can then, in accordance with the CQI and/or CSI coming from every MS, consider factors such as the quality of service (QoS) of every MS, allocate time frequency resource areas and deploy the applicable code modulation mode for each MS within the wireless resource range, and immediately provide channel aware resource allocation. For example, for MS with good channel quality, RS1 can deploy the MS time frequency resource area to create high level modulation (i.e., 16QAM) and/or increase the rate of coding; or, conversely, decrease the modulation level and/or rate of coding. Soon after the RS1 processing result, the confirmed wireless resource allocation information is sent to the MMR-BS (S440) via the upstream signal. In order to further simplify the control information sent from RS to MMR-BS, RS1 can simply send the newer portion of the resource allocation information relating to the previous allocation change, or resend this information after it has been compressed.

Signal Transmission Procedures

After receiving the resource allocation information from RS1, MMR-BS reports the resource allocation information via RS1 and enters the content into the corresponding UL-MAP and DL-MAP area, and also combines the MMR-BS and other RS resource allocation information to form the entire UL-MAP and DL-MAP, as can be seen in FIG. 5 (S450). Next, MMR-BS sends all complete physical layer signals formed (namely, UL-MAP and DL-MAP) through the upstream control signal to all MS (including MS1 and MS1) (S460), so that every MS transmits messages or data in accordance with the allocated wireless resources.

Now, if part of an MS is located outside a single-hop range of the MMR-BS, as with MS1, MMR-BS requires the assistance of a number of RS in an authorized cluster to broadcast the physical layer signal, namely by performing hopped transmissions, so that the MS within an extended range cluster or within blind spots can also receive these signals. For example, under the conditions in the present implementation example, MMR-BS transmits jointly with RS1, which was passed advance control signal authorization. After authorization, RS1 transfers the physical layer signal coming from MMR-BS to MS1 and MS2, and MS1 and MS2 can then transmit and receive data according to the allocated wireless resources. In this way, in the present implementation example, since the RS is authorized to carry out resource allocation, it is also authorized to carry out joint transmissions.

Under certain conditions, the RS carrying out resource allocation and joint transmissions could also be different RS. For example, under the conditions depicted in FIG. 1, due to the fact that MS3 is located within a single-hop range of the base station, RS2 can be authorized to perform resource allocation but need not be authorized to carry out joint transmissions, as the signal can be directly sent to MS3 through MMR-BS.

Furthermore, besides broadcast mode, MMR-BS can also send the physical layer signal to an RS specifically authorized to carry out resource allocation. For example, when MMR-BS sends the physical layer signal to RS1, because the signal includes content confirmed by RS1, MMR-BS need only send RS1 the portion of the signal unknown to RS1, and this can further reduce channel overhead.

The aforementioned combined FIG. 4 explains the process by which MMR-BS authorizes RS to perform resource allocation. MMR-BS can, in accordance with the process depicted in FIG. 4, authorize multiple RS to perform resource allocation. In addition, depending on the need, MMR-BS can also cancel authorization of certain RS. For example, while MMR-BS seeks to regain control rights, MMR-BS can send cancel authorization information to RS1 through the downstream control signal. After RS1 receives the cancel authorization information, it stops resource allocation processing, and reverts to performing simple MAC functions. Ordinarily, the modifications to MMR-BS control rights relative to the physical layer frame length are relatively slow; consequently a longer time interval can be selected for transmitting authorization information and cancel authorization information, for example approximately 90 to 900 physical frames in length.

At the same time, MMR-BS can also modify the user combination (MS or the next single-hop RS combination) of the authorized RS. For example, in a situation where MS1 shifts to within a single-hop range of MMR-BS, or a situation in which MS1 and MS2 both switch over to a bordering cluster, MMR-BS can send the modified authorization information to RS1 via the downstream control signal. After RS1 receives the modified authorization information, it will stop a specific user, such as the resource allocation processing of MS1 and MS2. Usually the change to a cluster's MS relative to the physical layer frame length is also rather slow, and for this reason the time interval between the authorization information and modify authorization information sent by MMR-BS is also approximately 90 to 900 physical frames in length.

In the aforementioned process, all preset wireless resource ranges contained in the authorization information, the time intervals sent by the MS or next single-hop RS combination carrying out autonomous resource allocation, as well as authorization, cancel authorization, and modify information are all confirmed by MMR-BS depending on the situation; this for example confirms changes based on the environment, or other factors such as load changes in the wireless robust access point (RAP). In this way, besides resource allocation right transfers to RS aimed at certain MS, it still controls the other management rights in the cluster.

The aforementioned implementation example explains in detail the specific process for performing channel aware resource allocation in an enhanced relay cluster. Using the above concepts, the method can perform other channel aware relays, for example, self-adapting code modulation techniques and channel aware H-ARQ, etc. In performing the processes for these techniques, the main points which differ from the present implementation example are limited to the specific RS execution process according to channel information, as well as the processing result. For example, in self-adapting code modulation, RS1 is only used in confirmed code modulation methods, and the code modulation method is reported to MMR-BS. Because of this, the concept is absolutely not limited to the implementation example made public here, and the aforementioned and similar applications all fall within the scope of this concept.

Figure 6:
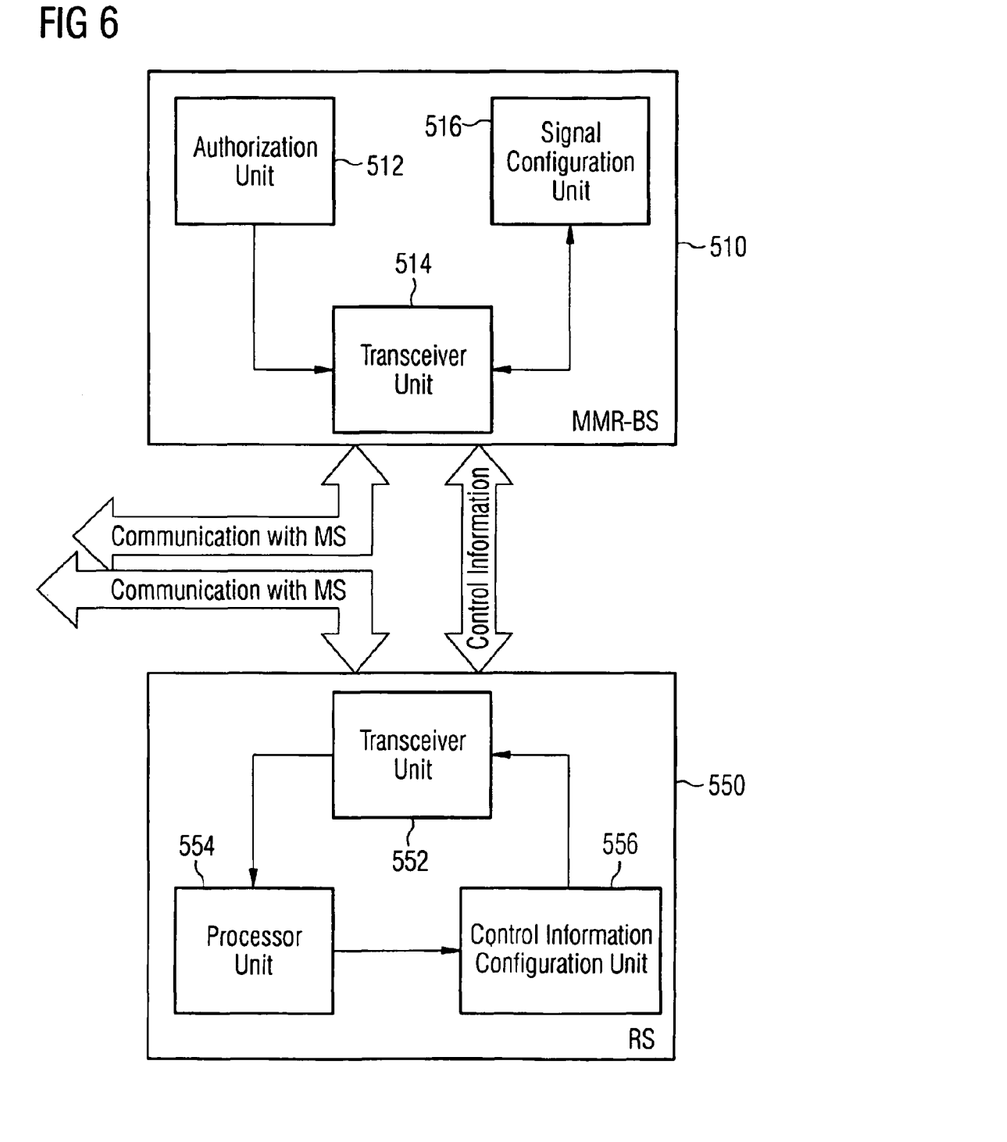
FIG. 6 is the block diagram for the multi-hop relay supported base station and relay station in accordance with one of the implementation examples.

The aforementioned combined attachments explain the methods. The methods can be implemented by modifying the MMR-BS and RS software in the Centralized Implementation Proposal, and can also increase or modify MMR-BS and RS hardware. FIG. 6 gives examples based on the MMR-BS and RS hardware composition of one implementation example.

As seen in FIG. 6, MMR-BS 510 includes authorization unit 512, transceiver unit 514 and signal configuration unit 516 in accordance with one of the implementation examples. Other components in the MMR-BS are all the same as those in current technology, and are not further discussed here.

The MMR-BS 510 shown in FIG. 6, transceiver unit 514 used with the RS or MS in the enhanced relay cluster perform all communication. Authorization unit 512 used to confirm authorization can use the preset wireless resource range through RS, as well as autonomously perform a combination of MS or next single-hop RS channel aware relays, and can also send any authorization information confirmed by transceiver 514 to the RS. After receiving the channel aware relays result through RS, transceiver 514 sends the processing result to signal form unit 516. Signal form unit 516 creates a complete physical layer signal in accordance with the aforementioned processing result, and sends the signal to all MS through transceiver 514, thereby providing control management of the MS in the cluster.

As FIG. 6 shows, in accordance with the implementation example, RS 550 includes transceiver unit 552, processor unit 554, and control information configuration unit 556. Other parts of the RS are the same as those in current technology, and are not further discussed here.

In RS 550 shown in FIG. 6, transceiver unit 552 is used with MMR-BS and the MS (or next single-hop RS) to provide communication within the RS 550 single-hop range. Once transceiver unit 552 receives authorization information from MMR-BS, it receives the channel information from the MS according to this authorization information, and transmits this information to processor unit 554. Processor unit 554 performs channel aware relays in accordance with this authorization information and MS channel information, and sends the processing result to control signal configuration unit 556. This control information configuration unit 556 configures part of the signal information in accordance with the processing result and authorization information and sends this signal information through transceiver unit 552 to MMR-BS, so that the physical layer signal created by the MMR-BS controls all MS. Transceiver unit 552 is also authorized to transfer the physical layer signal from MMR-BS.

FIG. 6 shows an example of hardware composition that can implement the methods. Workers in this area of technology should understand that, in the methods explained above, the functions carried out by random procedures can be integrated with hardware methods. Also, the functions implemented using the aforementioned methods can utilize multiple types of hardware, such as application-specific integrated circuits (ASIC), digital signal processors (DSP), digital signal processing documents (DSPD), programmable logic devices (PLD), field programmable gate arrays (FPGA), processors, controllers, microcontrollers, microprocessors, and others designed to be used implementing the electronic components or aforementioned groups of the functions explained in the present document. Thus, the hardware composition of MMR-BS and RS can vary, and is not limited to the conditions described in FIG. 6.

The aforementioned combined specific implementation example explains the method and system for performing channel aware relays in enhanced relay clusters. The system provided, based on the current Centralized Implementation Proposal, modifies the segment performed by the original multi-hop relay supported base station to transfer channel aware functions to the RS location. Because of this, RS no longer needs to periodically send large amounts of channel information to the aforementioned base station, and only needs to send the channel based processing results to the base station, thus lowering channel overhead, as shown in FIG. 3. At the same time, due to the increases in individual simple channel aware relay functions based on the RS in the Centralized Implementation Proposal, the RS still maintains a relatively simple composition, and does not involve a complex cooperation process between RS, RS and BS, thus keeping RS design cost and level of complexity still relatively low. Of course, the functions that RS can perform are in no way limited to this, but include other suitable functions that fall within the scope of the RS.

In light of the methods provided, MS located within a single-hop range of the multi-hop relay supported base station can directly report channel information to RS within shorter distances, and MS power dissipation is thus reduced compared with directly reporting to the base station, and interference within the cluster is thus to a certain degree reduced.

Furthermore, in the traditional Centralized Implementation Proposal, when the multi-hop relay supported base station broadcasts the signal to all RS participating in the joint transmission, the code modulation proposals employed by this base station are dependent on the worst channel conditions confirmed between these RS and the base station, and its modulation count or encoding rate thus both suffer from certain limitations. However, in the methods described herein, assuming all RS participating in the joint transmission are authorized to perform channel aware relays, then every RS independently determines part of the physical layer signal. Now, if a certain broadcasting RS (see RS1 in FIG. 1) already knows a portion of the signal, it only needs to perform broadcasts with other RS (e.g. RS2). In this way, the reduction in the number of RS in broadcast groups can be workable in part according to the RS channel state determined to be used in code modulation proposal broadcasts, and thus possibly use higher level modulation or higher speed encoding proposals, thereby increasing signal transmission speed. In limited RS numbers or when using simple broadcast mode to send the signal, the advantage of this becomes apparent.

Technical personnel working in this field should be aware that further improvements of various types may be made to the method and equipment for performing channel aware relays in an enhanced relay clusters described herein, while continuing to operate based on the concept.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir 2004).

The invention claimed is:

1. A type of method for relay station execution in a cluster with enhanced relay, comprising:
   receiving, from the base station in the cluster, authentication information of channel aware relays provided by the relay station;
   obtaining a processing result of the channel aware relays based on the authentication information and channel information received from the relay station by at least one terminal and/or next single-hop relay station within a single-hop range of the relay station; and
   transmitting at least part of the processing result to the base station in accordance with the authentication information.

2. The method in claim 1,
   wherein when the channel aware relays provided by the relay station includes wireless resource allocation, the authentication information includes a preset wireless resource range which is allocated to the relay station and is independently transmittable by the relay station, and
   wherein said method further comprises transmitting to the base station the wireless resource allocation information within the processing result, and
   wherein the preset wireless resource range is independently dispatched and allocated through the relay station.

3. The method in claim 2, wherein the preset wireless resource range includes a time frequency range used for communication between the relay station and at least one terminal and/or the next single-hop relay station.

4. The method in claim 3, wherein the processing result transmitted to the base station includes a modulation encoding method.

5. The method in claim 1, further comprising receiving commands from the base station pertaining to cancelling or modifying the authentication to provide the channel aware relays, contained in cancel authentication information or modify authentication information, respectively.

6. The method in claim 5, wherein a substantial time interval occurs between receiving the authentication information and the cancel or modify authorization information.

7. The method in claim 1, wherein at least part of the processing result includes only altered portions of previous processing results.

8. The method in claim 7, wherein the processing result is sent in the form of a code.

9. The method in claim 1, wherein the channel information is processed using at least a channel information based resource allocation function, a channel information based self-adapting code modulation function, or a channel information based combined automatic request retransmission function.

10. The method in claim 1, wherein a signal from the base station is passed to at least one terminal or the next single-hop relay station.

11. A method of enhancing performance of base stations that support multi-hop relays within a cluster that includes relay stations, comprising:
    sending processing authentication information to at least one relay station authorized to provide channel aware relays; and
    receiving channel aware relays results from the at least one relay station authorized to provide channel aware relays, and
    wherein the channel aware relays results are based on the authentication information and channel information received from the relay station by at least one terminal and/or next single-hop relay station within a single-hop range of the relay station.

12. The method in claim 11, further comprising:
    generating a signal in accordance with processing results; and
    sending the signal to all terminals in the enhanced relay cluster.

13. The method in claim 12, wherein when the channel aware relays provided by the at least one relay station which has been authorized includes wireless resource allocation, the authentication information includes a preset wireless resource range allocated to the at least one relay station, which is independently transmittable by the relay station, and the processing results include the wireless resource allocation information.

14. The method in claim 13, wherein the preset wireless resource range includes the time frequency resource range used for communication between the at least one relay station and a terminal within a single-hop range and/or the next single-hop relay station.

15. The method in claim 12,
    wherein said sending the signal includes transmitting the signal through at least one of the relay stations which uses a transmission physical layer signal, and
    wherein the at least one relay station authorized to perform the channel aware relays does not have to be the at least one of the relay stations.

16. The method in claim 15, wherein the signal sent to the at least one relay station authorized to execute channel aware relays does not include processing results of the at least one of the relay stations.

17. The method in claim 13, wherein combination and time intervals between the preset wireless resource range and a combination of terminal or next single-hop relay station is determined in accordance with changes in a wireless environment or changes in load size.

18. The method in claim 12, wherein the channel aware relays include at least one of: a channel information based resource allocation function, a channel information based self-adapting code modulation function, and a channel information based combined automatic request retransmission function.

19. The method in claim 12, wherein the processing results include a code modulation mode.

20. The method in claim 11, wherein every relay station authorization message of the at least one relay station includes a combination, which includes the terminal or next single-hop relay station of the relay station carrying out the channel aware relays.

21. The method in claim 11, further comprising sending cancel authentication information or modify authentication information to the at least one relay station.

22. The method in claim 21, wherein a substantial time interval occurs between sending the authentication information and the cancel or modify authentication information.

23. A relay station in an enhanced relay-type cluster which has a base station, comprising:
   a transceiver unit transmitting information to the base station and to at least one terminal and/or next single-hop relay station within a single-hop range of the relay station;
   a processor unit carrying out channel aware relays, in accordance with authentication information received from the base station by the transceiver unit and channel information received from the at least one terminal and/or the next single-hop relay station by the transceiver unit; and
   a control information configuration unit sending at least part of constructed control information from a processing result based on the authentication information and the channel information of said processor unit to the base station via said transceiver unit.

24. The relay station in claim 23, wherein when the channel aware relays provided by the aforementioned authorized relay station includes wireless resource allocation, the authentication information includes the time frequency resource range used in communication between the relay station and at least one terminal and/or the next single-hop relay station, and the processing result includes at least a portion of the wireless resource allocation information.

25. The relay station in claim 23, wherein the channel aware relays include at least one of: a channel information based resource allocation function, a channel information based self-adapting code modulation function, and a channel information based combined automatic request retransmission function.

26. The relay station in claim 23, wherein said transceiver unit receives channel information based cancel authentication information or modify authentication information governing authorized execution of cancellation or modification from the base station, and
   wherein said processing unit stops execution of applicable channel aware relays in accordance with the cancel authentication information or the modify authentication information.

27. The relay station in claim 23, wherein said transceiver unit transmits the base station signal to the at least one terminal and/or the next single-hop relay station.

28. A base station that supports multi-hop relays in an enhanced relay-type cluster providing communication between terminals via at least one of a plurality of relay stations, comprising:
   a transceiver unit transmitting information to at least one relay station or a terminal; and
   an authentication unit sending authentication information to the at least one relay station via said transceiver unit, authorizing the at least one relay station to perform channel information-based processing, in response to which said transceiver unit receives a channel aware relays result from the at least one relay station, and
   wherein the channel aware relays result is based on the authentication information and channel information received from the relay station by at least one terminal and/or next single-hop relay station within a single-hop range of the relay station.

29. The base station in claim 28, further comprising a signal configuration unit configuring a signal sent via said transceiver unit to all terminals and/or relay stations in the enhanced relay-type cluster in accordance with the channel aware relays result received by said transceiver unit from at least one relay station.

30. The base station in claim 29, wherein when channel aware relays performed by the at least one relay station includes wireless resource allocation, the authentication information includes a time frequency resource range allocated to the at least one relay station, which is independently transmittable by the at least one relay station, the time frequency resource range being used for communication between the at least one relay station and the terminal and/or next single-hop relay station within a single-hop range, and
   wherein the time frequency resource range is independently dispatched and allocated through the at least one relay station.

31. The base station in claim 30, wherein said authentication unit determines the time frequency resource range allocated to the at least one relay station in accordance with changes in a wireless environment or changes in load size.

32. The base station in claim 29, wherein the signal is transmitted by at least one of the relay stations to all terminals, and the at least one of the relay stations used to transmit the signal does not have to be the at least one relay station performing the channel aware relays.

33. The method in claim 29, wherein the channel aware relays includes at least one of: a channel information based resource allocation function, a channel information based self-adapting code modulation function, and a channel information based combined automatic request retransmission function.

* * * * *

UNITED STATES PATENT AND TRADEMARK OFFICE
CERTIFICATE OF CORRECTION

PATENT NO.         : 8,391,777 B2                                       Page 1 of 1
APPLICATION NO.    : 12/311436
DATED              : March 5, 2013
INVENTOR(S)        : Li et al.

It is certified that error appears in the above-identified patent and that said Letters Patent is hereby corrected as shown below:

On the Title Page Item [73], Delete "Network" should read -- Networks --.

In the Claims
Column 9, Line 62, Claim 6, Delete "authorization" should read -- authentication --.
Column 12, Line 45, Claim 33, Delete "method" should read -- base station --.

Signed and Sealed this
Eighteenth Day of March, 2014

Michelle K. Lee
*Deputy Director of the United States Patent and Trademark Office*